(12) United States Patent
Stratton et al.

(10) Patent No.: US 6,382,501 B1
(45) Date of Patent: May 7, 2002

(54) FURNACE BRAZING

(75) Inventors: Paul Francis Stratton, Bradley Huddersfield; David Geoffrey Groome, Harrogate, both of (GB)

(73) Assignee: The BOC Group, plc, Windlesham (GB)

( * ) Notice: Subject to any disclaimer, the term of this patent is extended or adjusted under 35 U.S.C. 154(b) by 0 days.

(21) Appl. No.: 09/240,392

(22) Filed: Jan. 29, 1999

(30) Foreign Application Priority Data

Jan. 30, 1998 (GB) ................................. 9801996

(51) Int. Cl.⁷ .................... B23K 13/06; B23K 31/02; B23K 20/22
(52) U.S. Cl. .................. 228/218; 228/220; 228/262.1; 228/262.9
(58) Field of Search ............................ 228/218, 124.1, 228/219, 220, 262.1, 262.9

(56) References Cited

U.S. PATENT DOCUMENTS

| | | | | |
|---|---|---|---|---|
| 3,698,699 A | * | 10/1972 | Bochinski et al. | 266/5 R |
| 3,707,762 A | * | 1/1973 | Bochinski et al. | 29/494 |
| 3,754,698 A | * | 8/1973 | Bochinski et al. | 228/42 |
| 4,294,395 A | * | 10/1981 | Nayar | 228/220 |
| 4,504,007 A | * | 3/1985 | Anderson, Jr. et al. | 228/123 |
| 4,541,876 A | * | 9/1985 | Hwang | 148/22 |
| 5,495,979 A | * | 3/1996 | Sastri et al. | 228/124.1 |
| 5,529,816 A | * | 6/1996 | Sartini et al. | 427/600 |
| 5,569,075 A | * | 10/1996 | Leturmy | 454/66 |
| 5,904,993 A | * | 5/1999 | Takeuchi et al. | 428/627 |

* cited by examiner

*Primary Examiner*—Tom Dunn
*Assistant Examiner*—Zidia Pittman
(74) *Attorney, Agent, or Firm*—Jousha L. Cohen; Salvatore P. Pace

(57) ABSTRACT

A brazing method for joining to or more pieces of metal together includes running a molten brazing solder into a space between the pieces, heating at least the adjacent surfaces of the pieces to be joined to brazing temperature in a reducing atmosphere and preheating at least the adjacent surfaces to about 600° C. in an oxidizing atmosphere prior to said heating to the brazing temperature.

11 Claims, 2 Drawing Sheets

FURNACE BRAZING

BACKGROUND OF THE INVENTION

The present invention relates to a method of brazing, particularly but not exclusively to a method of furnace brazing copper.

As is well-known in the art, brazing is a method of joining two or more pieces of metal or of alloy together by means of a very thin film of a suitable brazing solder (sometimes called "spelter"). The brazing solder is melted and directed into the space between the pieces, and as it cools and solidifies it fuses and joins the pieces together. Brazing differs from welding in that in brazing the metal surfaces being joined are not themselves fused with the brazing solder, the melting point temperature of the brazing solder usually being considerably lower than that of the metal being joined.

In a common process, known as furnace brazing, the brazing solder is placed, either in the form of small particles or as a solid preform, on and adjacent to the joint (thus forming what is known as a "brazement"); a flux may be similarly placed, and then the whole is heated to brazing temperature by being placed in a continuous type furnace where the brazing solder melts and runs by capillary action in between the pieces.

A problem in most brazing processes arises due to the cleanliness of the surfaces to be joined together; the presence of any oil, grease, oxide or any other surface contaminant can affect the flow of the molten brazing alloy along, and its adhesion on fusing to, the metal surfaces. This leads to poor capillary action which results in the creation of discontinuous and poorly-adherent joints (or "dry joints"). If capillary action is poor the brazing solder will not run as far thus brazing solder must be placed closer to all the joints in a brazement increasing set-up time and expense.

There are several conventional techniques for addressing this cleanliness problem. For example, the surfaces can be cleaned and degreased with solvents prior to brazing, however this is time-consuming and relies on the use of costly and environmentally-harmful solvent materials. Such methods are also usually rather ineffective in removing oxides from the surfaces to be joined, particularly as further oxidation can occur as the brazement is heated to the brazing temperature. Consequently, it is common to carry out brazing in an inert gas atmosphere in order to prevent such further oxidation. Heretofore therefore, in order to improve the standard of brazed joints, efforts have been directed towards the substantial elimination of the surface contaminants known to adversely affect brazing time and brazing adhesion.

It is an object of this invention to address the problems associated with the prior art with the aim of producing a brazing method which provides an improved brazed joint and/or to reduce the set-up time, expense or other disadvantageous results of conventional methods.

SUMMARY OF THE INVENTION

The present invention provides a brazing method for joining two or more pieces of metal together comprising running a molten brazing solder into a space between the pieces, characterized by the step of heating at least the adjacent surfaces of the pieces to be joined to brazing temperature in a reducing atmosphere and by the step of preheating at least the adjacent surfaces to a predetermined temperature below the brazing temperature but above the temperature where oxidation readily occurs in an oxidizing atmosphere prior to said heating to brazing temperature.

Preferably this predetermined temperature is between about 400° C. and 700° C., and typically about 600° C. for copper.

Contrary to the generally-accepted convention, we have found that the deliberate oxidation of the surfaces to be brazed, followed by reduction just prior to the brazing operation (which reduction atmosphere provides a fluxing action, to remove the oxides existing on the surface of the metal) produces an excellent combination of braze gap filling, strongly adherent bonding between the fused brazing solder and the metal and final surface appearance of the brazed joint, and a combination which represents an improvement over the prior art.

It is believed that the advantages arising from the method of the invention are due to the fact that a freshly reduced surface has a higher surface 'activity' than an already oxide-free surface, and thus is 'wettable' by the brazing alloy resulting in better gap filling. Although the surface of a joint brazed in accordance with the invention may have less "gloss" than one brazed in a conventional manner, this is only really of any relevance in applications in which surface decoration rather than joint integrity is important.

Preferably, the method comprises supplying an inert gas to the furnace to provide a furnace atmosphere predominantly composed of said inert gas, an oxidizing gas being introduced into the preheating zone and a reducing gas being introduced into the heating zone.

The predominance of inert gas prevents further oxidation of the surfaces to be joined and the concentration of oxidizing and reducing gases to be controlled accurately and consistently. For example, copper brazing is typically carried out in an exothermically generated gas atmosphere. Such atmospheres contain hydrogen, carbon monoxide, carbon dioxide and water vapour as well as nitrogen. The hydrogen and carbon monoxide present in the atmosphere would react with any oxygen (as air) added to a pre-oxidation zone creating water vapour and carbon dioxide which are not oxidizing to copper. It would be necessary therefore to make sufficient oxygen addition to convert all the hydrogen and carbon monoxide in the pre-treatment zone plus a small excess to give the required oxidation. However, as exothermically generated gas used for brazing typically contains a combined hydrogen and carbon monoxide content of anything between 2% and 22%, the control of a small excess of oxygen would be difficult especially as the hydrogen and carbon monoxide are not themselves controlled. The best results are therefore likely to be achieved using an inert nitrogen based atmosphere system with air added to the pre-treatment zone for the oxidation step and hydrogen to the brazing zone for the reduction step.

Preferably the oxidizing gas is introduced so as to maintain the free oxygen level in the preheating zone in the range 0.2% to 0.3%, since such a range has been found to provide optimum braze joint characteristics. Such an atmosphere at 600° C. is sufficiently oxidizing to ensure the removal of any residual organic material from the surface of the copper and to form the necessary adherent oxide film.

We have found that treatment of copper in lower oxygen atmospheres for short periods does not result in visible oxide film (probably due to a relatively slow oxidation site nucleation rate at low oxygen levels). Even at higher oxygen levels the oxide layer is very thin and is best described by the copper:oxygen ratio of the surface layer.

A method in accordance with this invention will now be described, by way of example and with reference to the accompanying drawing of a test piece used to provide the comparative results below.

DETAILED DESCRIPTION OF THE INVENTION

Referring to FIG. 1, a simple brazing test piece was devised to give a consistently increasing braze gap but which did not require accurate machining. The test piece consisted of two 300 mm lengths of 15 mm diameter copper tube 2 which were bound together with copper wire at each end (not shown). At a distance of 250 mm from one end a 1 mm diameter wire 4 was placed between the tubes producing a constantly increasing and consistent gap. A 75 mm length-6 of braze alloy (Phos0 (BS1845:1984 CP3) supplied by Thessco Limited) weighing 2g which was calculated to be sufficient to fill 75% of the joint length was placed at the point where the tubes touched.

Figure 1:
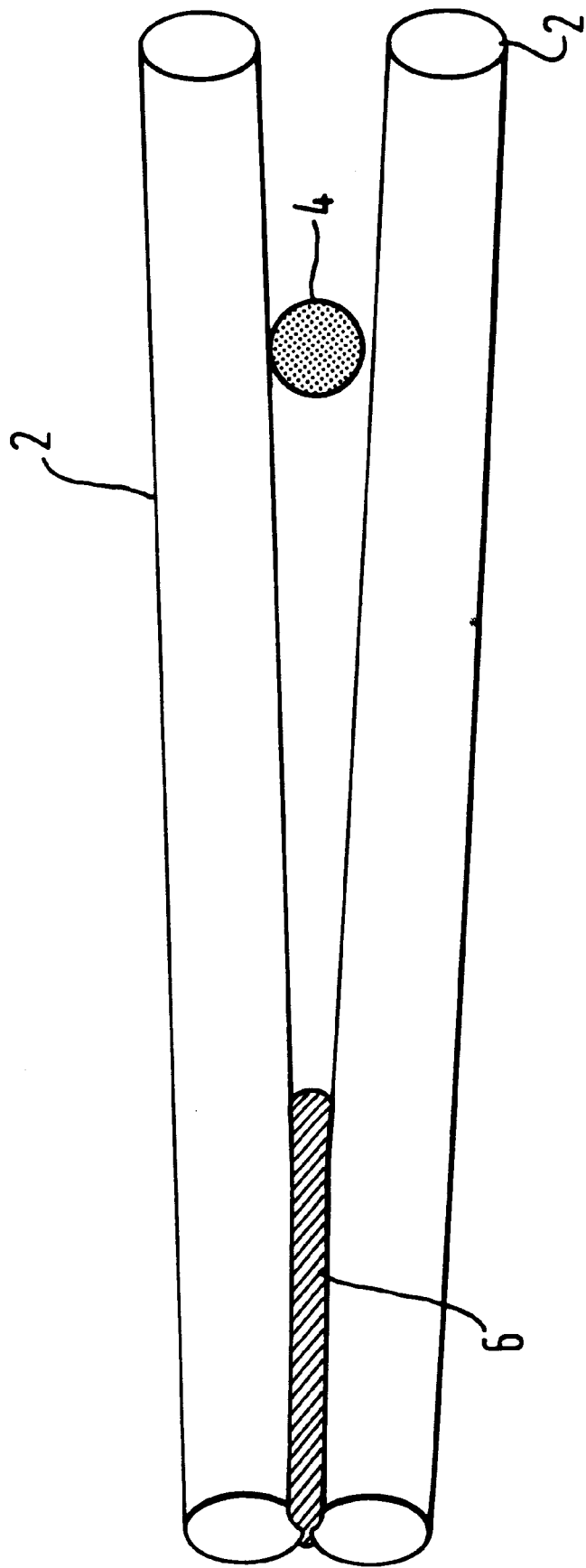
FIG. 1 is an elevational view of a test piece used to test the method of the present invention.
Figure 2:
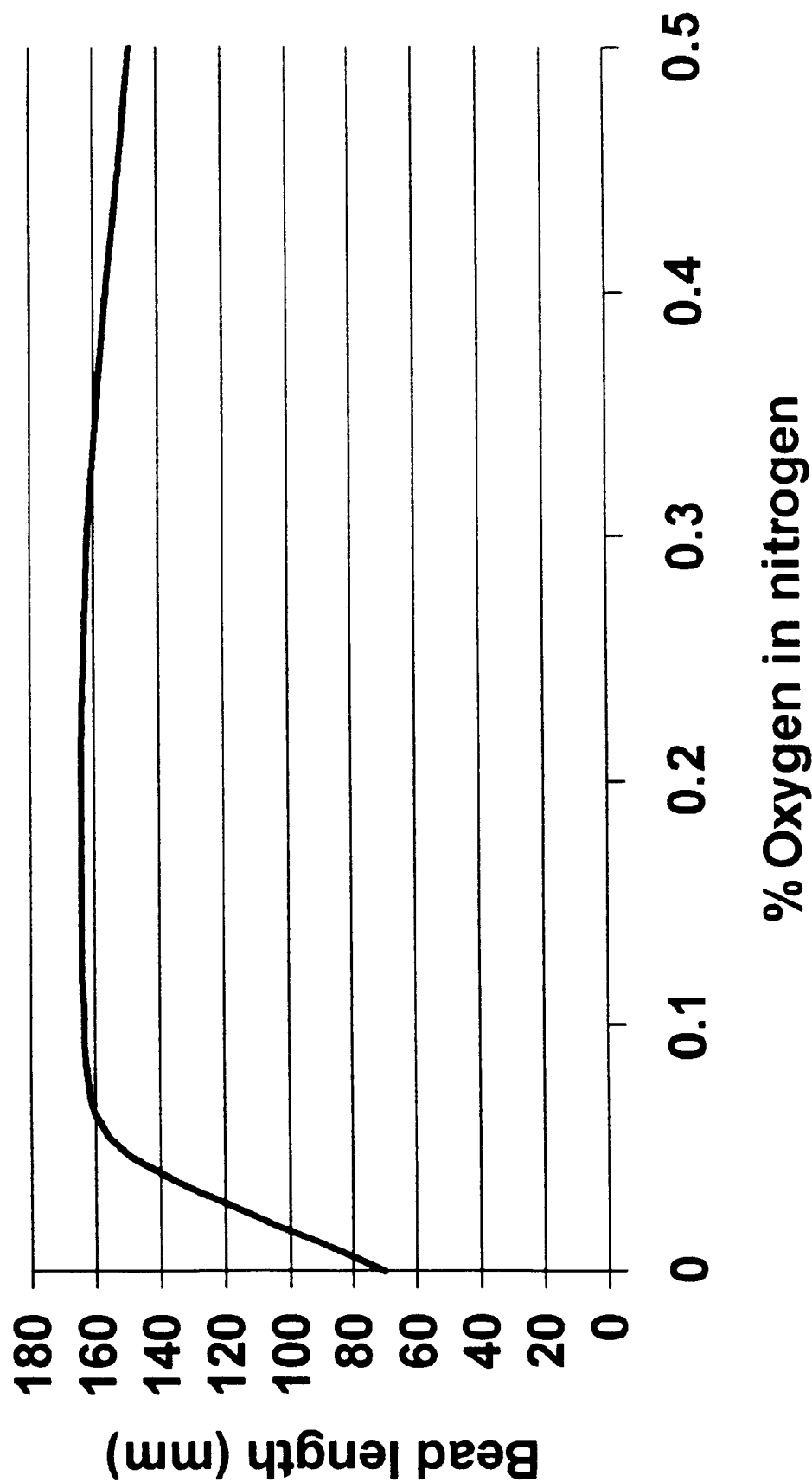
FIG. 2 is a graph depicting the effect of pre-oxidation on braze bead length.

The assemblies were subjected to the range of pre-treatments shown in Table 1 before being brazed in a nitrogen/3% hydrogen atmosphere at 730° C. using a laboratory 12" (300 mm) mesh belt furnace. At least four samples were treated for each set of conditions with further samples being treated if the variation in results exceeded 10%.

TABLE 1

Sample pre-treatments

| Treatment Number | Pre-treatment | Appearance |
| --- | --- | --- |
| 1 | As received (degreased by vendor) | Inconsistent cold drawn gloss with some discoloration |
| 2 | Degreased in trichlorethylene just prior to treatment | Inconsistent cold drawn gloss with some discoloration |
| 3 | Treated in industrially pure nitrogen (2 ppm oxygen) at 600° C. | Consistent cold drawn gloss |
| 4 | Cleaned in a nitrogen/3% hydrogen atmosphere at 730° C. | Consistent cold drawn gloss |
| 5 | Oxidised in nitrogen/0.3% air at 600° C. for 7 minutes | Consistent adherent oxide |
| 6 | Oxidised in nitrogen/0.5% air at 600° C. for 7 minutes | Consistent adherent oxide |
| 7 | Oxidised in nitrogen/0.1% air at 600° C. for 7 minutes | Consistent very thin adherent oxide |
| 8 | Oxidised in nitrogen/0.05% air at 600° C. for 7 minutes | Consistent almost invisible adherent oxide |

Treatment numbers 1 to 4 are examples in which the cleansing pre-treatment methods were non-oxidizing. The brazing bead length for each of these treatments shown in Table 2.

TABLE 2

Experimental results for non-oxidizing treatments

| Treatment Number | Pre-treatment | Bead Length (mm) |
| --- | --- | --- |
| 1 | As received (degreased by vendor) | 70–75 |
| 2 | Degreased in trichloroethylene just prior to treatment | 73–77 |
| 3 | Cleaned in industrially pure nitrogen (2 ppm oxygen) at 600° C. | 73–74 |
| 4 | Cleaned in a nitrogen/3% hydrogen atmosphere at 730° C. | 70–85 |

It can be seen from Table 2 that none of the non-oxidizing treatments had any significant effect on brazing performance. A second degreasing operation just prior to treatment produced a marginal but statistically insignificant improvement as did treating the samples in an industrially pure nitrogen atmosphere at 600° C. It has been shown that treatment of copper in low oxygen atmospheres for short periods does not result in an oxide film probably due to a relatively slow oxidation site nucleation at low oxygen levels. It is thought, however, that this atmosphere at 600° C. would be sufficiently oxidizing to ensure the removal of any residual organic material from the surface.

To ensure that some other pre-existent furnace contaminant that could inhibit brazing and would normally be removed by the brazing atmosphere was not present samples were processed through the furnace under the standard brazing conditions but without the braze alloy present. This treatment resulted in some small, but inconsistent, improvement. Thus, pre-oxidation of the brazement followed by reduction greatly improves the gap filling ability of the braze alloy in furnace brazing of copper. The optimum conditions for the pre-oxidation are those to form a thin, tightly adherent oxide layer with a copper: oxygen ratio of 3.3 to 1. Under experimental conditions such an oxide was formed with exposure of the brazements to 0.1% oxygen in nitrogen at 600° C. for 7 minutes.

Accordingly, the deliberate pre-oxidation of the brazement (thus providing a tightly adherent oxide on a surface to be brazed) immediately prior to submitting the surface to a reducing atmosphere and brazing has been found to produce an improvement. The increase in bead length on the test pieces shows the improved gap-filling ability of the braze alloy in furnace brazing of copper using the method of the present invention, which produces a high quality brazed joint, i.e., one which is both substantially free of discontinuities and also tightly adherent. This is a surprising result of encouraging oxidation in a brazing operation, when heretofore efforts have been concentrated on eliminating or at least reducing oxidation.

Whilst a separate pre-oxidation step is satisfactory for experimental work it would not be cost effective in a production environment. In practice therefore, the pre-oxidation step must be carried out contiguously with the brazing operation, preferably without the need for a specially designed furnace. Separate atmosphere zones could be created within the furnace hot zone as described above. Alternatively, an atmosphere system based on non-cryogenically generated nitrogen would be equally effective and in some cases more economic. Nitrogen can be generated non-cryogenically using either pressure swing adsorption (PSA) or membrane technologies. Such nitrogen contains a small amount of residual oxygen. For the pre-oxidation stage this oxygen level could be controlled to give the correct pre-oxidation conditions and for the reducing stage be reacted with hydrogen either in the furnace or externally over a catalyst to produce a suitable atmosphere.

Those skilled in the art will appreciate that the pieces of metal to be joined by the method of this invention need not be pure, and indeed that they may be alloys. Moreover, although the examples relate to the brazing of copper, the invention is applicable to other metals, such as copper alloys and steel.

Trials with steel tubes using a similar testing procedure gave similar results. In this instance the braze alloy used was 50 mm long. The brazing of cleaned and degreased samples resulted in a braze length averaging 69 mm, while those pre-oxidised for 10 minutes at 660° C. with 0.1% oxygen gave an average braze length of 110 mm when brazed in a reducing atmosphere.

Results indicate that if the oxide layer is too thick it cannot in practice be reduced in the time available in a typical brazing furnace before the braze alloy melts. Even if this thicker layer is successfully reduced the spread of the braze alloy is lower than for thinner layers due to flashing (spreading of the braze alloy over the whole component).

It will be apparent to those skilled in the art that various modifications and variations can be made to the methodology of the present invention without departing from the scope or spirit of the invention. In view of the foregoing, it is intended that the present invention cover modifications and variations of this invention provided they fall within the scope of the following claims and their equivalents.

We claim:

1. A method for joining together two pieces of metal by brazing, the method comprising the steps of:

providing molten brazing solder between the metal pieces;

preheating at least adjacent surfaces of the metal pieces in an oxidizing atmosphere to a predetermined temperature above which oxidation occurs and which is less than a brazing temperature of the adjacent surfaces; and heating in a reducing atmosphere at least the adjacent surfaces of the metal pieces to be joined to the brazing temperature.

2. The method according to claim 1, wherein said pre-heating and heating steps occur in contiguous zones within a furnace.

3. The method according to claim 2, further comprising the steps of:

supplying an inert gas to the furnace to provide a furnace atmosphere substantially of said inert gas;

introducing an oxidizing gas into a preheating zone of the furnace; and a reducing gas into a heating zone of the furnace.

4. The method according to claim 3, wherein the step of introducing the oxidizing gas is at a rate sufficient to maintain an oxygen concentration in the pre-heating zone of from between 0.05% and 0.3%.

5. The method according to claim 3, wherein the oxidizing gas is air.

6. The method according to claim 3, wherein the reducing gas is hydrogen.

7. The method according to claim 6 wherein the hydrogen is introduced into the heating zone of the furnace at a rate sufficient to maintain a concentration of the hydrogen therein of at least 2%.

8. The method according to claim 3, wherein the inert gas is nitrogen.

9. The method according to claim 1, wherein the predetermined temperature is from between 400° C. and 700° C.

10. The method according to claim 1, wherein the metal comprises:

copper, and the predetermined temperature is maintained to at least 600° C. for a period of time sufficient for an oxide layer having a copper to oxygen ratio of not less than 5:1 to form thereon.

11. The method according to claim 10, wherein said period of time is approximately seven minutes.

* * * * *